Aug. 24, 1943.  J. O'D SHEPHERD  2,327,465
PULSE REGENERATOR
Filed July 11, 1941  7 Sheets-Sheet 1

INVENTOR
JUDSON O'D. SHEPHERD
BY M. T. McKenney
ATTORNEY

Aug. 24, 1943.  J. O'D SHEPHERD  2,327,465
PULSE REGENERATOR
Filed July 11, 1941  7 Sheets-Sheet 2

INVENTOR
JUDSON O'D. SHEPHERD
BY
ATTORNEY

Aug. 24, 1943.　　　J. O'D SHEPHERD　　　2,327,465
PULSE REGENERATOR
Filed July 11, 1941　　　7 Sheets-Sheet 3

INVENTOR
JUDSON O'D. SHEPHERD
BY
ATTORNEY

Aug. 24, 1943.  J. O'D SHEPHERD  2,327,465
PULSE REGENERATOR
Filed July 11, 1941  7 Sheets-Sheet 4

INVENTOR
JUDSON O'D. SHEPHERD
BY
ATTORNEY

Aug. 24, 1943.    J. O'D SHEPHERD    2,327,465
PULSE REGENERATOR
Filed July 11, 1941    7 Sheets-Sheet 6

INVENTOR
JUDSON O'D. SHEPHERD
BY
ATTORNEY

Patented Aug. 24, 1943

2,327,465

UNITED STATES PATENT OFFICE 2,327,465

PULSE REGENERATOR

Judson O'D. Shepherd, Atlanta, Ga.

Application July 11, 1941, Serial No. 401,914

8 Claims. (Cl. 177—353)

This invention relates to pulse regenerators of the register sender type comprising essentially a mechanical device which is used as a link in an electrical circuit for relaying electrical effects.

The object of the invention is to provide a simple and economical mechanical device which will respond to incoming electrical effects and thereafter control the transmission of outgoing electrical effects. In one form the incoming and outgoing electrical effects will be identical except in what may be termed purity. Such a device is particularly useful in long signaling circuits where due to the length and condition of the transmission circuit the incoming signals may be distorted both in time and strength. Such a device will then respond to such signals and thereupon transmit regenerated or corrected signals. The device in a preferred embodiment herein disclosed is useful in a telephone system for the regeneration of switch setting pulses which are usually transmitted on a decimal basis, spoken of as trains of digital pulses. In this form the device responds to a train of pulses by translating such train into a code and operating a set of mechanically displaceable elements—also in code. Thereafter the device operates to be in position to affect another set of displaceable elements corresponding to a succeeding train of pulses.

After a number of sets of displaceable elements corresponding to the number of digits are set and depending on the type of start circuit employed, a detector and outgoing pulse controller is placed in operation. This moves a set of detector contacts into association with the first set of displaceable elements and corresponding contacts are closed by the displaced elements, each displaced element acting as a cam to move the corresponding contact of such detector. Thereupon a circuit arrangement translates the code detected into a digital train of pulses and when this train has been fully transmitted the detector is moved on to association with the next set of said displaceable elements.

Release is accomplished by moving both the detector mechanism and the displaceable element operating mechanism to normal. The latter, carrying a camming member, restores all displaced elements to normal in its sweep back to normal. In order to fully accomplish this function this displaceable element operating mechanism moves back to a point a step beyond the position where it is associated with the first set of such elements and is thereupon immediately moved forward until it is in such position. The detector moves back to a normal position one step beyond the position where it is associated with the first set of displaceable elements.

In another embodiment of the invention the sets of displaceable elements may be set under keyboard control rather than in response to incoming digital trains of impulses and thus may serve as a key-pulsing sender.

In another embodiment the outgoing electrical effect instead of being in the form of digital trains of pulses may be in the form of other signals, to operate, by way of example, a call indicator.

A feature of the invention is an arrangement including a plurality of sets of mechanically displaceable elements, a mechanical displacing means movable into association with said sets separately and a mechanical detector also movable into association with said sets separately.

A feature of the invention by which the present device differs from known arrangements is the use of sets of displaceable elements permanently positioned and associated with movable setting and movable detecting means.

Another feature of the invention resides in the restoring means by which the individual displaceable elements are returned to normal. When the device has functioned, not only are the setting and detecting arms released to normal but the setting arm in moving to such normal position sweeps over the field of displaceable elements and returns all to normal. As part of this feature novel means for releasing the setting means to a point beyond normal is employed and provision is made to automatically move such setting means forward immediately thereafter.

Other features will appear in the following description.

The drawings consist of seven sheets having eighteen figures as follows.

For the sake of clarity the greater part of the frame on which the various elements of this device are mounted has been omitted, but it will be understood that a suitable frame is provided which will hold the various parts secured in the positions shown. The web 1 may be considered part of the frame and the part 2 on which contacts 3 and 4 are mounted are part of the same frame. Also it will be understood that the various magnets such as 5, 6, 7 and 8 are secured to the frame. In the following description it will be understood that other immovable parts such as the indicated anchorages for the retractile springs for holding the armatures of these magnets are also appropriately secured to the frame even where mention of this fact has been omitted.

The device consists essentially of an arcuate shaped frame member 12 in which a plurality of sets of displaceable elements are mounted. The numerals 13 to 21, inclusive, in Figs. 1 and 10 indicate different sets of these displaceable elements and the numerals 22 to 25, inclusive, in Fig. 4 indicate the four displaceable elements of the set elsewhere designated 21. There is also a fifth displaceable element such as 26 associated with each set of such elements which operates in a different manner as will appear hereinafter.

Figures 12, 14:
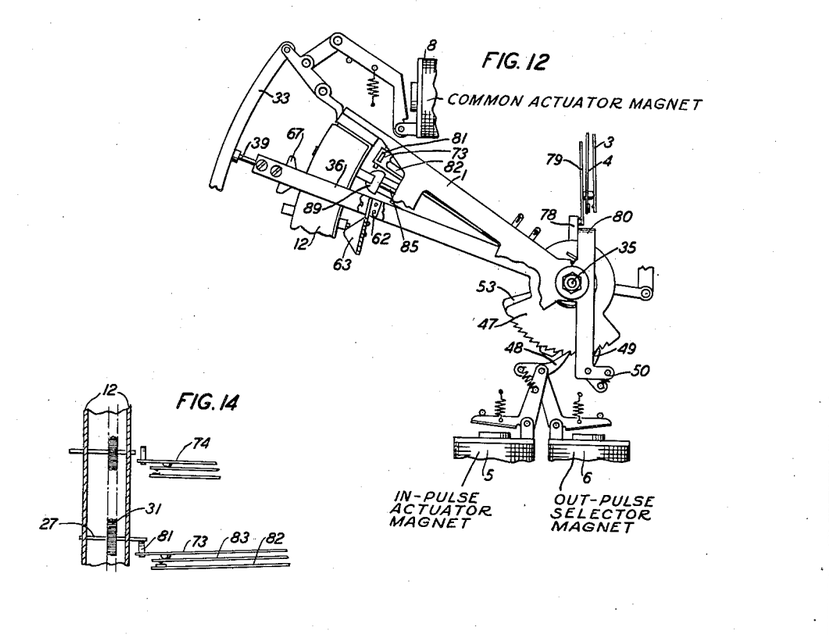
Fig. 12 is a fragmentary side view showing details of the in-pulse selector arm and illustrating the means by which all displaced elements are restored to normal as the in-pulse selector arm returns to normal. This figure also shows the out-pulse off-normal contacts in their position when the out-pulse selector arm is in normal position.
Fig. 14 is a fragmentary top view taken along the broken line 14—14 of Fig. 13 illustrating how the switches of the out-pulse selector arm are operated by displaced elements.
Figure 13:
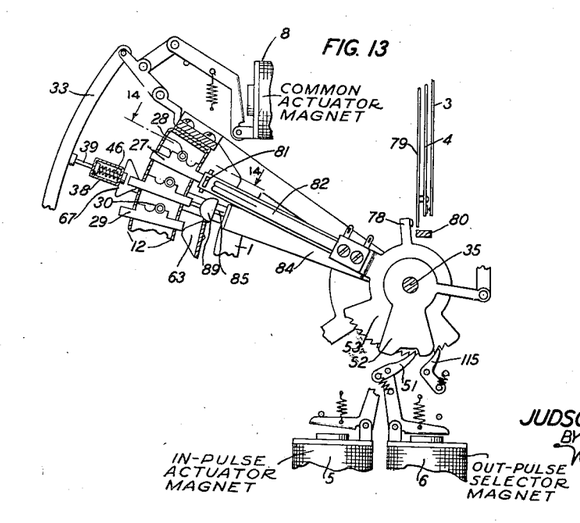
Fig. 13 is a fragmentary side view showing the position of the out-pulse off-normal contacts when the out-pulse selector arm has been advanced into cooperative relation with the first set of displaceable elements.
Figure 15:
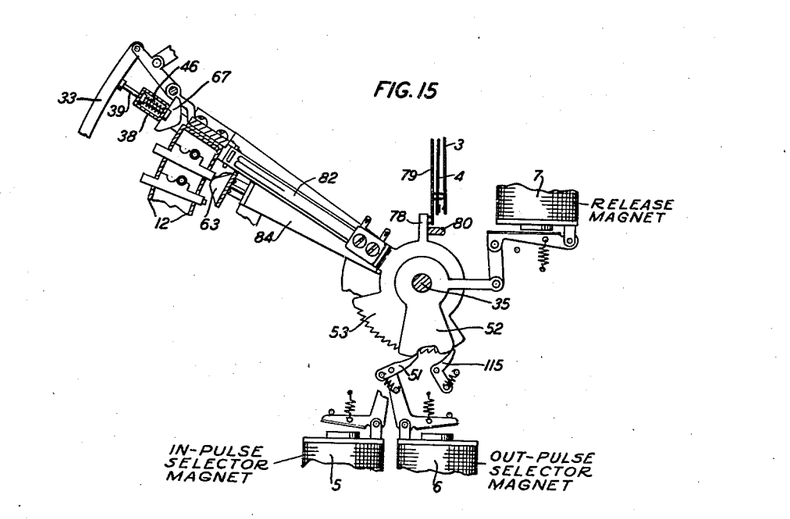
Fig. 15 is a fragmentary side view showing the action of the release magnet.
Figure 16:
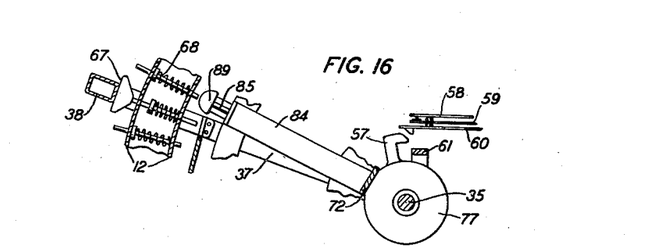
Fig. 16 is a fragmentary side view showing the in-pulse selector arm just one step ahead of the out-pulse selector arm and illustrating the means by which the overtake switch is operated.
Figure 17:
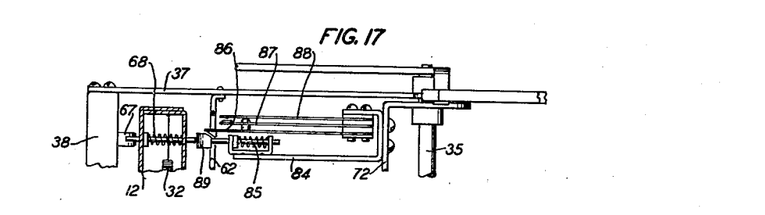
Fig. 17 is a fragmentary top view used in conjunction with Fig. 16 to illustrate the manner in which the overtake switch is operated.

Each element of the sets of displaceable elements with the exception of the fifth element, is formed in such a manner that it will remain in either its normal or its operated position under the influence of a coiled spring. In Fig. 13 the displaceable element 27 is shown held in its operated position by the spring 28 and the displaceable element 29 is shown held in its normal position by the spring 30. The springs 31 and 32 in Figs. 14 and 17, respectively will indicate how these retaining springs are mounted and secured to the frame piece 12.

Figure 1:
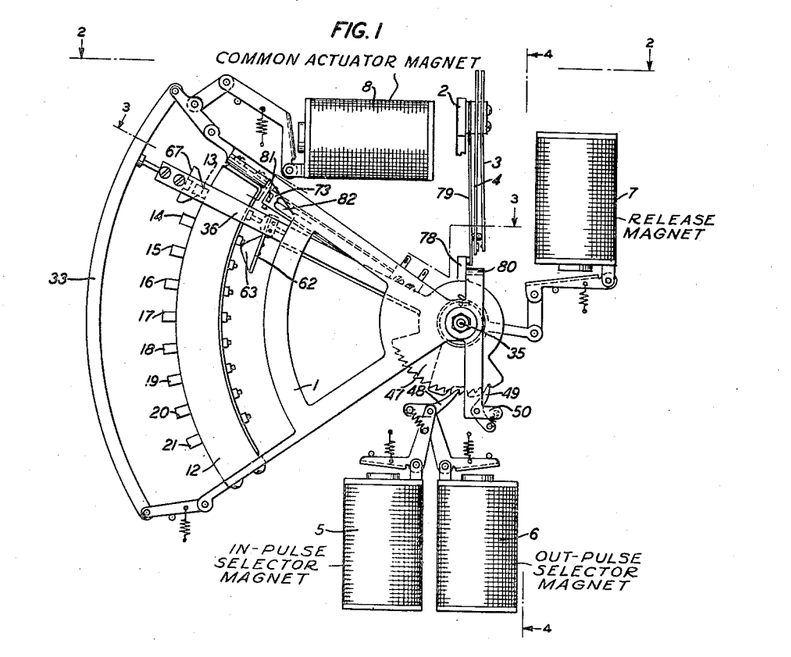
Figure 1 is a side elevation in diagrammatic form of the essential elements of the device of the present invention, in normal idle condition.
Figures 4, 10, 11:
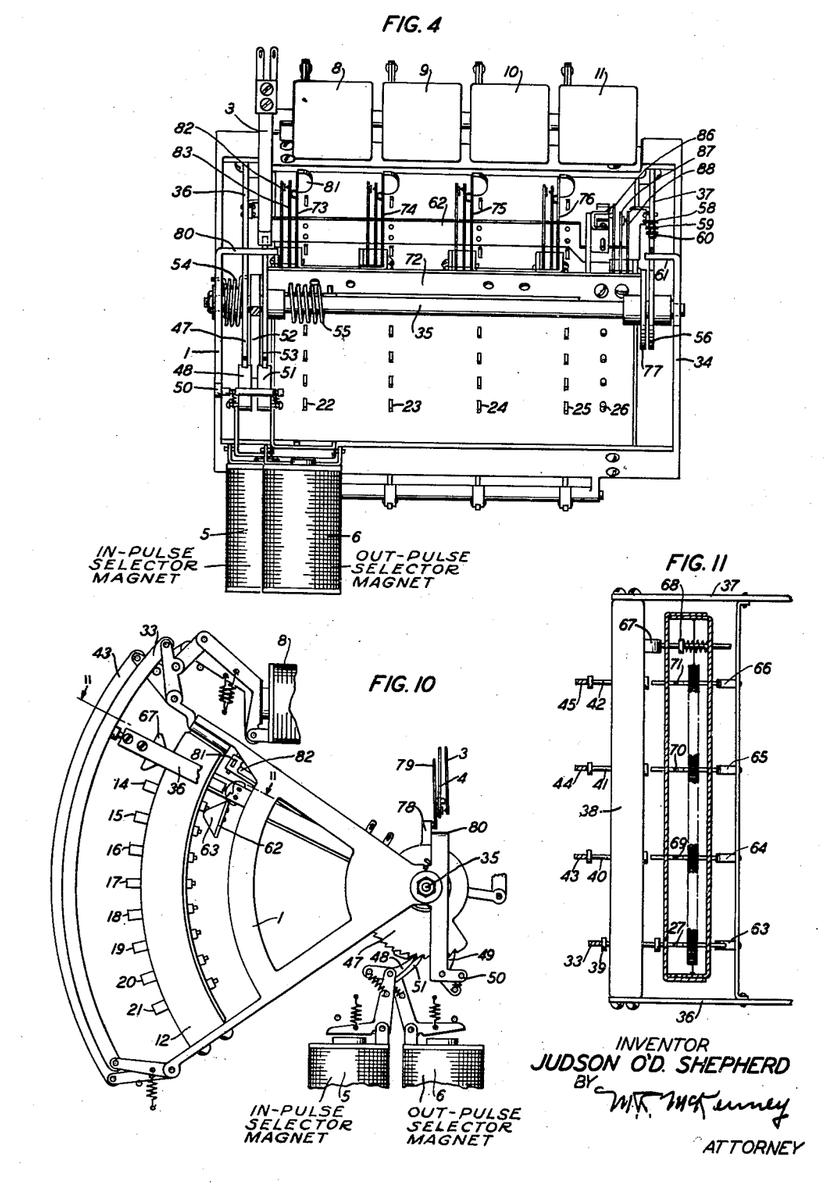
Fig. 4 is an end view taken as indicated by the broken line 4—4 in Fig. 1.
Fig. 10 is a fragmentary side elevation showing one switch setting magnet operated and another in normal position to illustrate the manner in which the separate displaceable elements of a set may be operated.
Fig. 11 is a fragmentary top view used in conjunction with Fig. 10 to illustrate the manner of setting the separate displaceable elements of a set.
Figure 5:
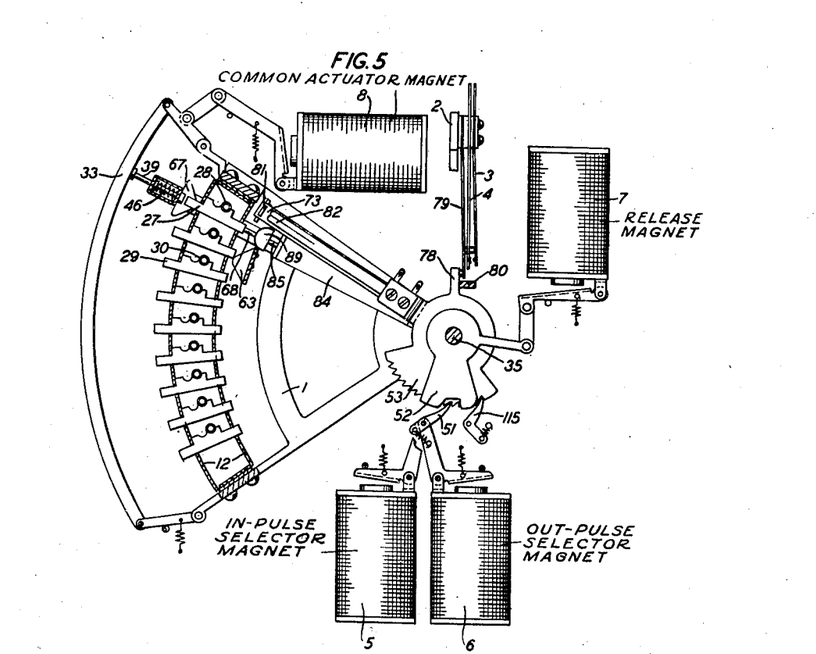
Fig. 5 is a fragmentary side elevation taken as indicated by the broken line 5—5 in Fig. 2.

When the device is in its normal position as indicated in Fig. 1, each displaceable element of each set is in the position of element 29 shown in Fig. 5, for example. At this time the in-pulse selector arm is in cooperative relationship with the first set of elements 13. Each element in this set is then under control of one of the magnets 8 to 11. If the magnet 8 is energized then by attracting its armature it will move an arcuate common actuator 33 in the manner indicated in Fig. 10 and cause the element 29 to assume the position shown in Fig. 13.

The in-pulse selector arm and the out-pulse selector arm are rotatable elements by means of which the circuit arrangement to be hereinafter described may be operatively associated with any given set of displaceable elements. Rigidly secured to the frame 1 and its companion piece 34 is a shaft 35 on which the rotatable selector arms are mounted.

Figure 2:
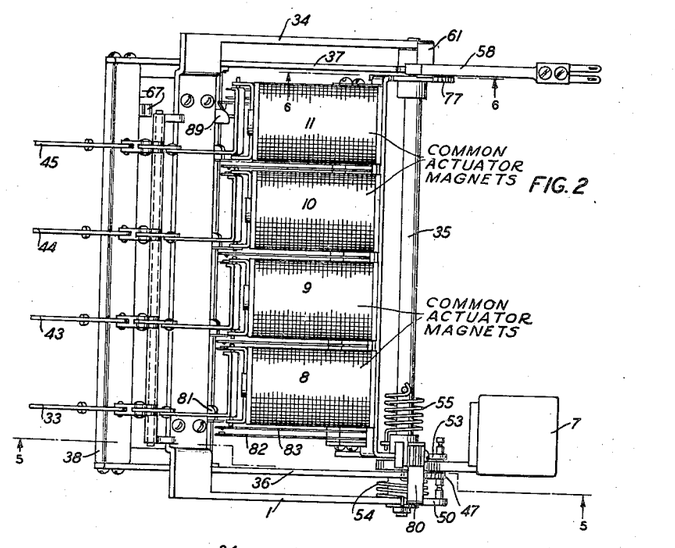
Fig. 2 is a plan view of the same, taken as indicated by the broken line 2—2 in Fig. 1.
Figure 3:
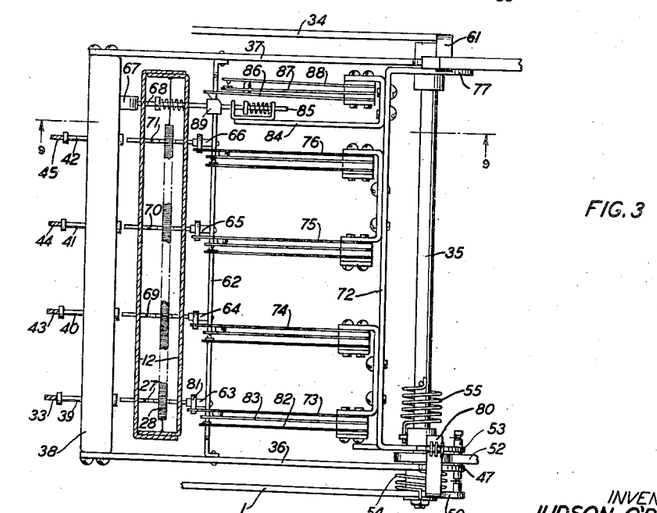
Fig. 3 is a fragmentary view of the device taken as indicated by the broken line 3—3 in Fig. 1.

The in-pulse selector arm comprises the two arms 36 and 37, best seen in Figs. 2, 3 and 4, together with the various elements secured thereto. Secured from the extremity of arm 36 to the extremity of arm 37 is the element 38 which carries a set of links 39, 40, 41 and 42, as may best be seen in Fig. 11, which serve as operating links between the arcuate common actuators 33, 43, 44 and 45, respectively, and the corresponding displaceable elements with which the in-pulse selector arm has cooperatively associated them. Each link is in the form of a plunger normally retained in a direction to tend to bear upon its associated arcuate common actuator by a spring such as the spring 46 associated with the link 39, shown by Figs. 5 and 13.

The in-pulse selector arm 36, at the end thereof where it is mounted on the shaft 35, is formed into a ratchet wheel sector 47. A pawl 48 operated by the in-pulse magnet 5 cooperates with this ratchet wheel sector 47 to move the in-pulse selector arm step by step into cooperative relationship with the various sets of displaceable elements. A dog 49 secured to an element 50 forming part of the frame will act to retain the in-pulse selector arm in any position to which it has been moved.

The out-pulse selector arm is provided with a ratchet wheel sector 53 similar to the ratchet wheel sector 48 which is under control of a pawl 51 operated by the out-pulse magnet 6. Ratchet wheel sector 53 is maintained in the position to which it is moved by a dog 115 similar in function to dog 49. A release cam 52 is rotatably mounted on the shaft 35 between the ratchet sector 47 and the ratchet sector 53 of the out-pulse selector arm. The release cam 52 operated by the release magnet 7 will engage both pawls 48 and 51 and the dogs 49 and 115 and lift them out of engagement with the teeth of the ratchet sectors 47 and 53 and allow the in-pulse selector arm to return to normal under the influence of spring 54 and the out-pulse selector arm to return to normal under the influence of spring 55.

Figure 6:
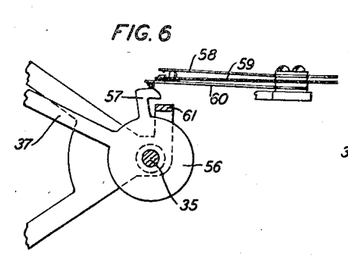
Fig. 6 is a fragmentary and detailed view of the means for operating the in-pulse off-normal contacts as indicated by the broken line 6—6 in Fig. 2, while the in-pulse selector arm is in normal position.

As the arm 36 of the in-pulse selector arm terminates at the shaft 35 in a ratchet wheel sector 47, so the arm 37 terminates in an element 56 provided with an integral cam formation 57. In the normal position of the in-pulse selector arm (Fig. 6) and the subnormal position thereof (Fig. 8) in which it remains only for an instant, the cam 57 causes the in-pulse off-normal contacts 58 and 59 to open an associated circuit therethrough. In these two positions the cam 57 engages a cooperating cam on the spring 60 which lifts the contact spring 58 away from the spring 59. In all other positions of the in-pulse selector arm the associated circuit is closed through the springs 58 and 59.

Figures 7, 8:
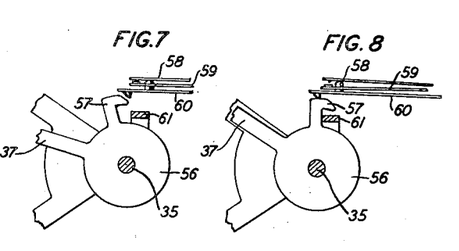
Fig. 7 is a similar view showing the position of the in-pulse off-normal contacts after the in-pulse selector arm has been advanced.
Fig. 8 is a similar view showing the position of the in-pulse off-normal contacts during the restoring movement and at the time the in-pulse selector arm has reached its extreme position in its clockwise movement and before it has been automatically stepped one step forward to its normal position.
Figure 9:
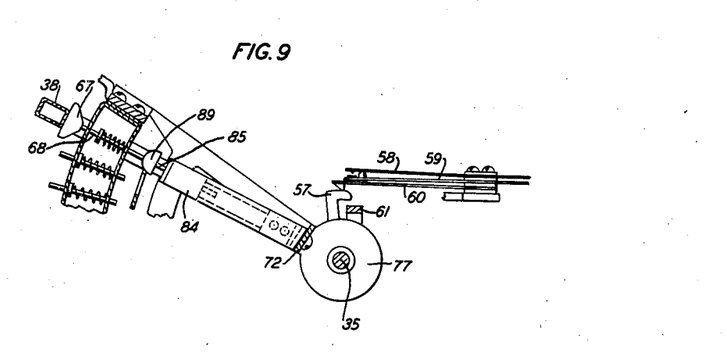
Fig. 9 is a fragmentary view of the overtake switch arm in its normal position as indicated by the broken line 9—9 in Fig. 3.

Movement of the in-pulse selector arm in its releasing movement beyond the subnormal position indicated in Fig. 8 is prevented by a stop 61 which is part of the frame.

An element 62 in the form of a bar is secured to the arms 36 and 37. This bar carries four cams 63, 64, 65 and 66 which cooperate with the displaceable elements and act to return them to their normal positions on the return movement of the in-pulse selector arm. These cams are always associated with the next set of displaceable elements in order from the set upon which registration is taking place. For instance, when the in-pulse selector arm is in cooperative relationship with set 13, the restoring cams are in association with set 14. For this reason on the restoring movement of the in-pulse selector arm this arm is caused to move one step beyond its normal position to a subnormal position from which it is immediately returned one step forward automatically. Due to this temporary movement into a subnormal position the restoring cams are brought into association with the first set of displaceable element 13 to restore any displaced elements thereof to normal.

The element 36 also carries a cam 67 which is used for the purpose of operating an overtake switch. There is a spring returned plunger associated with each set of displaceable elements which is moved whenever the in-pulse selector arm is associated with such set of elements. Thus the plunger 68 is associated with the set of elements 13, consisting of elements 27, 69, 70 and 71 (Fig. 3). It will appear hereinafter that when the out-pulse selector arm moves into position one step behind the in-pulse selector arm that the operated plunger 68 (or a corresponding one) will cause the operation of the overtake switch so that the two selector arms cannot at the same time be associated with the same set of displaceable elements.

The out-pulse selector arm consists essentially of a U-shaped member 72, best seen in Fig. 3, on which four sets of detector contact springs associated individually with springs 73, 74, 75 and 76 are mounted as well as the overtake switch. This member 72 terminates in two parts by which it is rotatably mounted on the shaft 35. One of such parts constitutes the ratchet sector 53 while the other becomes a simple bearing element 77. The ratchet sector is provided with an arm 78 (Figs. 12 and 13), which in the normal position of the out-pulse selector arm moves the spring 79 to cause the associated circuit through the out-pulse off-normal contacts 3 and 4 to open. In all other positions of the out-pulse selector arm the said associated circuit is closed. A portion 80 of the frame acts as a stop to prevent this arm from moving backward beyond its normal position.

Each set of detector contact springs comprising a detector switch consists of a spring such as 73 (Figs. 3 and 14) provided with a cam 81 mounted on the end thereof and arranged to cause a circuit through springs 82 and 83 to become closed. When the out-pulse selector arm moves into association with a set of displaceable members each detector switch associated with a displaced member will be operated, as clearly indicated in Fig. 14.

Also mounted on the bar 72 (Fig. 3) is the overtake switch assembly consisting of a mounting 84 carrying a spring plunger 85 arranged to move the spring 86 to cause the opening of the associated circuit through the contact springs 87 and 88. A cam 89 is mounted on the end of the spring plunger 85 for the proper mechanical cooperation of the plungers 85 and 68 as will be apparent particularly in Figs. 3, 9, 16 and 17. This overtake switch is mounted so as to be in association with the set of displaceable elements ahead of the set with which the outpulse selector arm is associated so that when the latter approaches within one set of the position of the in-pulse selector arm it will be prevented by means controlled by the overtake switch from advancing until the in-pulse selector arm has taken another step.

The registration of a series of trains of impulses is effected by depression of a combination of elements 22 to 25 in each of sets 13 to 21 in order. The control circuit for the device, as will hereinafter be described, will cause the operation of one or more registration magnets 8 to 11 in accordance with a predetermined code upon receipt of the first train of impulses. This will result in the operation of one or more of the four common actuators 33 to depress a corresponding element or elements 22 to 25 of the first set 13. Upon release of this registration magnet or magnets, the in-pulse portion of the device, including member 12, is advanced to the set of elements 14 by magnet 5. Receipt of the second train of pulses will result in corresponding registration thereof in set 14, and the subsequent advance to set 15. This is repeated until all trains of pulses are registered.

When the first train of impulses has been registered and the member 12 has advanced to set 14, the overtake contacts 87 and 88 are closed to signal the control circuit that a train of pulses may be transmitted beyond. The out-pulse portion is then advanced one step to where detector contacts 73—76 may be actuated by any elements 22—25 in row 13 which may have been displaced. The actuation of one or more of the latter contacts will complete a circuit or combination of circuits corresponding to the code of the first train of impulses. This combination is decoded, as will be described and transmitted beyond. If the in-pulse portion has, in the meantime, advanced to set 15, the out-pulse portion will advance after a brief interval to set 14, decode the registration thereon, and transmit the corresponding train beyond. This is repeated until all registered trains have been transmitted. The contacts 87 and 88 are opened to prevent further advance of the out-pulse portion whenever it reaches a set of contacts just back of those with which member 12 is engaged. In some applications of the device, the start of the out-pulses may be delayed until the entire number has been registered or a start signal is furnished the out-pulse portion that it may begin transmission of the registration.

When the device is to be released, release magnet 7 will be operated to raise the pawls and dogs which advanced and maintained, respectively, both portions of the device in their operated positions, causing both to restore. The cams 63—66 force the elements 22 to 25 of all sets which it passes back to normal by cam action. Since the cams 63—66 are one position ahead of member 12, the in-portion is restored to a subnormal position so that the elements of set 13 will be restored, whereupon it is advanced one step to its normal position where member 12 is in position to actuate the elements of set 13 upon receipt of a train of impulses in a new series.

Figure 18:
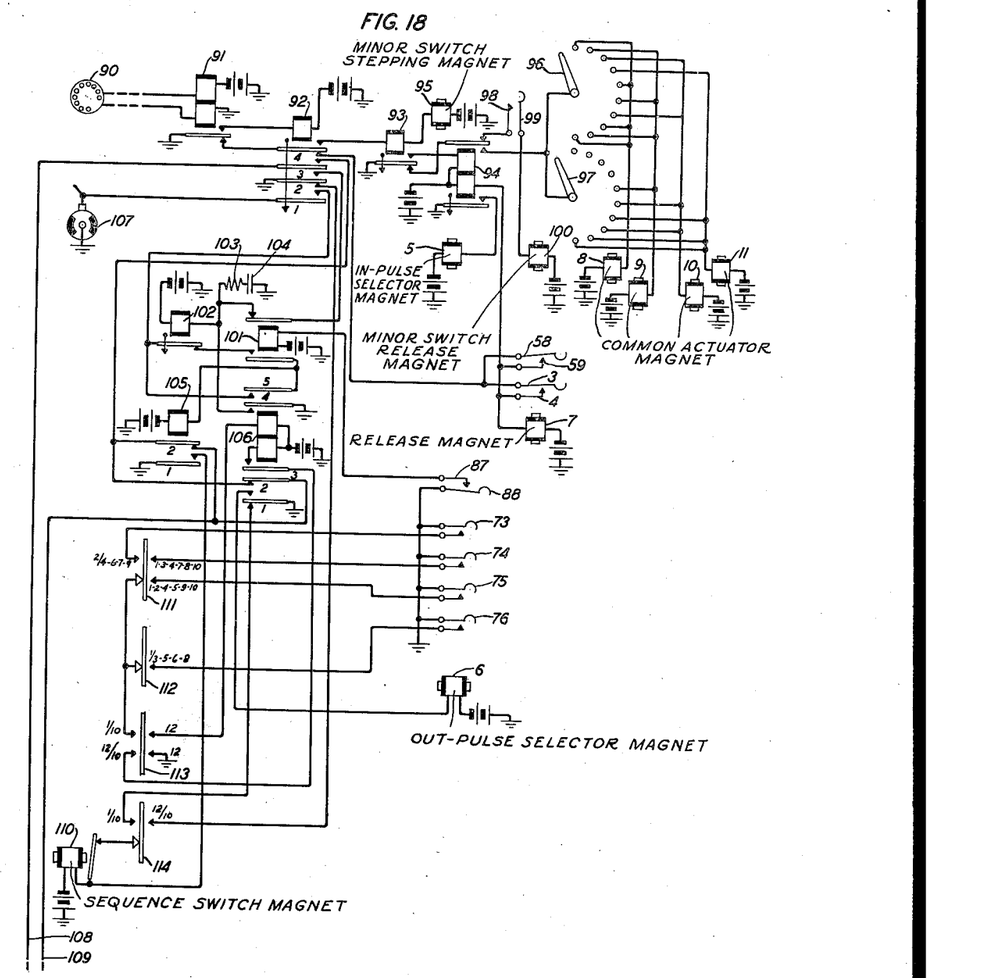
Fig. 18 is a circuit diagram of the electrical connections through which the apparatus of the previous figures is used for the purposes and objects of the invention.

The manner in which this device operates may further be explained in connection with the circuit diagram, Fig. 18. Here the dial 90 represents a subscriber station connected over its line to the central office relay 91. When a call is made, the relay 91 responds and causes the energization of the first slow releasing relay 92. When the dial 90 is operated each impulse in the usual form of a short interruption of the circuit results in the momentary deenergization of relay 91. Relay 92 does not respond and hence a circuit is established from ground, armature and back contact of relay 91, armature 4 and front contact of relay 92, winding of relay 93 and winding of magnet 95 to battery. Relay 93 responds to the train of impulses as a whole and the magnet 95 responds to each impulse separately. Magnet 95 drives the brushes 96 and 97 of a minor switch of conventional type and hence the position they assume corresponds to the number of impulses in a train.

A relay 94 is energized by the slow releasing relay 93 and this in turn causes the energization of the in-pulse selector magnet 5 so that this magnet moves its pawl 48 forward to engage another tooth in the ratchet sector 47 so that upon its deenergization the in-pulse selector arm will be advanced one step. At the end of the series of impulses relay 93 will in time release and establish a circuit from ground, its armature and back contact, the upper armature and front contact of relay 94 and thence in parallel to brushes 96 and 97 where the magnets 8 to 11, inclusive, will be energized in accordance with the code defined by their connections to the contacts on which these brushes at this time rest. Thus information is mechanically recorded in code on the first set of displaceable elements.

Shortly thereafter and in accordance with the slow releasing characteristics of relay 94, this relay releases to remove ground from brushes 96 and 97 to release whichever of magnets 8 to 11 may be operated and to allow magnet 5 to release and advance the in-pulse selector arm. At the same time, a circuit is established through the upper armature and back contact of relay 94, the off-normal contacts 98 and 99 of the minor switch having brushes 96 and 97 to the release magnet 100 whereby the brushes 96 and 97 are returned to normal ready to respond to the next train of impulses.

Through the advance of the in-pulse selector arm the overtake switch is released and so a circuit is established from ground through contacts 88 and 87 to the winding of relay 101. Relay 101 responds and opens the circuit for relay 102 (which was closed upon the operation of relay 92). Relay 102 is made slow to release by virtue of the resistance 103 and condenser 104 and thus holds a circuit for relay 105 open for a short period. It is the purpose of this slow to release arrangement to provide a minimum interval between the trains of impulses which are being transmitted. Upon the release of relay 102, relay 105 is placed in a circuit with interrupter 107 and upon the first closure of this circuit by the interrupter after the release of relay 102, relay 105 responds. It should be noted that conductors 108 and 109 represent the out-pulse circuit and that a connection from one to the other is closed upon the seizure of the line and the consequent energization of relay 92. This closed circuit may be traced from conductor 108 through armature 3 and front contact of relay 92, thence in parallel through armature 2 and back contact of relay 105 and back contact and armature 2 of relay 106 to conductor 109. Thus the first energization of relay 105 is ineffective to open the out-pulse circuit because relay 106 has not as yet become operated.

Relay 105 closes the circuit for the sequence switch magnet 110 and this causes the sequence switch to advance from position 11 (which is normal) to position 12 upon the subsequent release of relay 105 and magnet 110. The circuits through the cams 111 to 114 of the sequence switch are designated by numerals indicating their closed positions in the conventional manner. In position 12, a circuit for relay 106 is closed through cam 113 and since this occurs at the end of the impulse and upon the release of magnet 110 the out-pulse circuit is prepared to respond to the next operation of relay 105 by the interrupter 107, since the shunt about armature 2 and back contact of relay 105 is now removed by the movement of armature 2 of relay 106.

Upon the energization of relay 106, a circuit is closed for the out-pulse selector arm magnet 6 which steps the selector arm upon its energization (which differs from the action of the in-pulse selector arm magnet 5). If at this time the in-pulse selector arm has not been further advanced the overtake switch will be operated and relay 101 released. In any event relay 106 will be locked in through its lower winding, armature 3 and front contact and sequence switch cams 113, 112 and 111 to maintain the closed circuit for relay 105 until the proper number of out-pulses have been transmitted under control of the operated detector contacts of the out-pulse selector arm. Each pulse caused by the operation of relay 105 will be followed by the advance of the sequence switch. Thus, after one pulse the sequence switch advances to position 1; after two pulses the sequence switch advances to position 2 and so forth.

As the switch wipers 96 and 97 are arranged to operate the magnets 8 to 11 in accordance with a given code, so the sequence switch cams 111 and 112 are arranged to translate this code into dial trains of pulses corresponding exactly to the incoming trains. Thus, if the digit 5 has been registered so that magnets 8 and 9 have been energized, then the detector contacts 73 and 74 will be closed and by means of cams 111 and 113, the relay 106 will remain energized over its lower winding, armature 2 and front contact until these cams have been moved into their fifth position after five openings of the out-pulse circuit have occurred. Thereupon relay 106 will become deenergized to shunt armature 2 and back contact of relay 105, to prevent further pulsing in the out-pulse circuit. Relay 106 is sufficiently slow to release to remain operated for the brief interval while the sequence switch is advancing from one position to the next.

Magnet 6 is deenergized and a circuit for the automatic return of the sequence switch to its normal position is closed through armature and back contact of relay 106 and sequence switch cam 114.

If the overtake switch is still closed the next digit will be transmitted in the same manner but if the overtake switch is open the transmission of the next digit will await the advance of the in-pulse selector arm.

When the subscriber releases the connection and relays 91 and 92 are both returned to normal a circuit from ground will be extended through the armature and back contact of relay 91, armature 4 and back contact of relay 92, thence in parallel through the out-pulse off-normal contacts 3 and 4 and the in-pulse off-normal contacts 58 and 59 to the release magnet 7. This will allow the out-pulse selector arm to return to normal and the in-pulse selector arm to move to its subnormal position.

It will be noted that the lower winding of relay 94 is in parallel with the release magnet 7. Hence the in-pulse selector magnet 5 will be energized during the energization of the release magnet 7. The relay 94 is slow to release and hence the magnet 5 is still energized when the release magnet becomes deenergized so that the pawl 48 will drop into an advanced tooth of the ratchet sector 47. Upon the release of relay 94 and the following release of magnet 5, the in-pulse selector arm is advanced from its subnormal to its normal position and the apparatus is ready to function again.

It should be noted that the overtake switch contacts 87 and 88 constitute a start control means. As the circuit arrangement is shown the out-pulsing will start as soon as the registration of the first digit has been completed. There may be other uses of this apparatus in which the out-pulses are not wanted until more than one train of in-pulses have been registered or until all of the trains of in-pulses have been registered or in other cases until some predetermined time or even in response to some outside operation. In any of these cases any well-known start control could operate another pair of contacts similar to and in series with the contacts 87 and 88.

It will be obvious that many other equivalent means may be employed for the specific elements of the present invention. By way of example it will be recognized that a code drum such as that shown in my copending application Serial No. 393,745, filed May 16, 1941 may be used as a means for moving the actuators such as 33 so that the minor switch and the selector magnets 8 to 11 may be eliminated. In another arrangement the magnets 8 to 11 may be operated through a set of keys in the manner set forth in my said copending application. Other arrangements which would readily occur to one skilled in the art are embraced within the spirit of this invention.

What is claimed is:

1. A device comprising a plurality of sets of mechanically displaceable elements mounted in a fixed frame, a set of common actuating members, one for each element of a set, electromagnetic means including a group of magnets fixed with respect to said frame for operating said members, a set of links for transferring the operation of said members to the said mechanically displaceable elements of one of said sets at a time, means for moving said links into association with each of said sets of mechanically displaceable elements, a detector comprising a plurality of sets of contacts equal in number to the number of displaceable elements in each of said sets, each set of contacts adapted to be operated by a corresponding displaced element when said detector is associated with a particular set of said elements, means for moving said detector into association with each of said sets of mechanically displaceable elements, and signaling means controlled by said detector.

2. A device comprising a plurality of sets of mechanically displaceable elements mounted in a fixed frame, a set of common actuating members one for each element of a set, electromagnetic means including a group of magnets fixed with respect to said frame for operating said members, a set of links for transferring the operation of said members to the said mechanically displaceable elements of one of said sets at a time, means for moving said links into association with each of said sets of mechanically displaceable elements, a circuit arrangement responsive to incoming trains of digital pulses for controlling said electromagnetic means and said means for moving said links into association with each of said sets of mechanically displaceable elements, a detector comprising a plurality of sets of contacts equal in number to the number of displaceable elements in each of said sets, each set of contacts adapted to be operated by a corresponding displaced element when said detector is associated with a particular set of said elements, means for moving said detector into association with each of said sets of mechanically displaceable elements and signaling means controlled by said detector.

3. A device comprising a plurality of sets of mechanically displaceable elements, a set of common actuating members one for each element of a set, electromagnetic means for operating said members, a set of links for transferring the operation of said members to the said mechanically displaceable elements of one of said sets at a time, means for moving said links into association with each of said sets of mechanically displaceable elements, a circuit arrangement responsive to incoming trains of digital pulses for controlling said electromagnetic means and said means for moving said links into association with each of said sets of mechanically displaceable elements, a detector comprising a plurality of sets of contacts equal in number to the number of displaceable elements in each of said sets, each set of contacts adapted to be operated by a corresponding displaced element when said detector is associated with a particular set of said elements, means for moving said detector into association with each of said sets of mechanically displaceable elements, signaling means controlled by said detector, and means controlled by said signaling means for controlling said means for moving said detector.

4. A device comprising a plurality of sets of mechanically displaceable elements, a set of common actuating members one for each element of a set, electromagnetic means for operating said members, a set of links for transferring the operation of said members to the said mechanically displaceable elements of one of said sets at a time, means for moving said links into association with each said set of mechanically displaceable elements, a circuit arrangement responsive to incoming trains of digital pulses for translating said trains of pulses into a permutation code for operating said electromagnetic means in accordance with said code and for controlling said means for moving said links into association with each of said sets of mechanically displaceable elements, a detector comprising a plurality of sets of contacts equal in number to the number of displaceable elements in each of said sets, each set of contacts adapted to be operated by a corresponding displaced element when said detector is associated with a particular set of said elements, means for moving said detector into association with each of said sets of mechanically displaceable elements and signaling means controlled by said detector.

5. A device comprising a plurality of sets of mechanically displaceable elements, a set of common actuating members one for each element of a set, electromagnetic means for operating said members, a set of links for transferring the operation of said members to the said mechanically displaceable elements of one of said sets at a time, means for moving said links into association with said sets of mechanically displaceable elements in order beginning with a first set which marks the normal position of said links, a circuit arrangement responsive to incoming trains of digital pulses for controlling said electromagnetic means and said moving means, a detector comprising a plurality of sets of contacts equal in number to the number of displaceable elements in each of said sets, each set of contacts adapted to be operated by a corresponding displaced element when said detector is associated with a particular set of said elements, means for moving said detector into association with each of said sets of mechanically displaceable elements in order beginning from a step before said first set which said point marks the normal position of said detector, signaling means controlled by said detector, and means for releasing said moving means and said detector to their respective normal positions.

6. A device comprising a plurality of sets of mechanically displaceable elements, a set of common actuating members one for each element of a set, electromagnetic means for operating said members, a set of links for transferring the operation of said members to the said mechanically displaceable elements of one of said sets at a time, means for moving said links into association with said sets of mechanically displaceable elements in order beginning with a first set which marks the normal position of said moving means, a circuit arrangement responsive to incoming trains of digital pulses for controlling said electromagnetic means and said moving means, a detector comprising a plurality of sets of contacts equal in number to the number of displaceable elements in each of said sets, each set of contacts adapted to be operated by a corresponding displaced element when said detector is associated with a particular set of said elements, means for moving said detector into association with each of said sets of mechanically displaceable elements in order beginning with a step before said first set which said point marks the normal position of said detector, signaling means controlled by said detector, means for releasing said moving means for said links and for said detector to their respective normal positions, and means carried by said moving means for said links for restoring all displaced elements during the return of said last moving means to normal.

7. A device comprising a plurality of sets of mechanically displaceable elements, a set of common actuating members one for each element of a set, electromagnetic means for operating said members, a set of links for transferring the operation of said members to the said mechanically displaceable elements of one of said sets at a time, means for moving said links into association with said sets of mechanically displaceable elements in order beginning with a first set which marks the normal position of said moving means, a circuit arrangement responsive to incoming trains of digital pulses for controlling said electromagnetic means and said moving means, a detector comprising a plurality of sets of contacts equal in number to the number of displaceable elements in each of said sets, each set of contacts adapted to be operated by a corresponding displaced element when said detector is associated with a particular set of said elements, means for moving said detector into association with each of said sets of mechanically displaceable elements in order beginning with a step before said first set which said point marks the normal position of said detector, signaling means controlled by said detector, means for releasing said moving means for said detector to the normal position of said detector and releasing said moving means for said links to a position below its normal position, means for thereupon automatically moving said last moving means to its normal position, means carried by said last moving means for restoring all displaced elements during the return of said moving means to its subnormal position.

8. A device comprising a plurality of sets of mechanically displaceable elements, a set of common actuating members one for each element of a set, electromagnetic means for operating said members, a set of links for transferring the operation of said members to the said mechanically displaceable elements of one of said sets at a time, means for moving said links into association with said sets of mechanically displaceable elements in rotation beginning with a first set which marks the normal position of said moving means, a circuit arrangement responsive to incoming trains of digital pulses for controlling said electromagnetic means and said moving means, a detector comprising a plurality of sets of contacts equal in number to the number of displaceable elements in each of said sets, each set of contacts adapted to be operated by a corresponding displaced element when said detector is associated with a particular set of elements, means for moving said detector into association with each of said sets of mechanically displaceable elements in rotation beginning with a step before said first set which said point marks the normal position of said detector, signaling means controlled by said detector, a release magnet for releasing said moving means and said detector to the normal position of said detector and means controlled by said moving means and detector upon their release to move said moving means a single step forward from the normal position of said detector to the said normal position of said moving means.

JUDSON O'D. SHEPHERD.